(12) United States Patent
Hsu

(10) Patent No.: US 12,545,060 B2
(45) Date of Patent: Feb. 10, 2026

(54) PUNCTURE-PROOF AND RUN-FLAT TIRE

(71) Applicant: Sichuan Hertz Technology and Culture Group Co., Ltd., Sichuan (CN)

(72) Inventor: Shui-Chen Hsu, Yilan County (TW)

(73) Assignee: Sichuan Hertz Technology and Culture Group Co., Ltd., Chengdu (CN)

( * ) Notice: Subject to any disclaimer, the term of this patent is extended or adjusted under 35 U.S.C. 154(b) by 0 days.

(21) Appl. No.: 18/952,983

(22) Filed: Nov. 19, 2024

(65) Prior Publication Data

US 2025/0162353 A1 May 22, 2025

(30) Foreign Application Priority Data

Nov. 22, 2023 (TW) .................................. 112145172

(51) Int. Cl.
*B60C 17/04* (2006.01)
*B60C 17/06* (2006.01)

(52) U.S. Cl.
CPC ............ *B60C 17/047* (2013.01); *B60C 17/06* (2013.01)

(58) Field of Classification Search
CPC .................................................. B60C 17/047
See application file for complete search history.

(56) References Cited

U.S. PATENT DOCUMENTS

| 6,932,131 | B1* | 8/2005 | Hsu | .......................... | B60C 17/04 |
| | | | | | 152/158 |
| 2005/0039833 | A1* | 2/2005 | Hsu | ....................... | B60C 15/024 |
| | | | | | 152/151 |
| 2014/0318679 | A1* | 10/2014 | Hsu | ....................... | B60C 17/047 |
| | | | | | 152/520 |
| 2015/0343855 | A1* | 12/2015 | Hsu | ....................... | B60C 17/047 |
| | | | | | 152/520 |
| 2017/0120694 | A1* | 5/2017 | Hsu | ....................... | B60C 17/041 |
| 2017/0203616 | A1* | 7/2017 | Hsu | ....................... | B60C 17/041 |

* cited by examiner

*Primary Examiner* — Adrienne C. Johnstone
(74) *Attorney, Agent, or Firm* — Apex Juris, pllc; Cera Oh

(57) ABSTRACT

The present invention provides a puncture-proof and run-flat tire with a spare tire that could be rapidly assembled and be adaptive to an tire body by finely adjusted and locked, thereby providing puncture-proof and run-flat function. The puncture-proof and run-flat tire includes an tire body having two protruding hooks on two inner edges on two sides of an inner ring of the tire body and a spare tire tightly engaged with one of the two protruding hooks of the tire body. Therefore, a vehicle could continue travelling safely if the tire body becomes flat due to damage caused by foreign objects. The spare tire includes a plurality of spare tire blocks assembled with an elastic ring, a first fine-adjustment wire, and a second fine-adjustment wire. Therefore, the spare tire could be rapidly mounted on the protruding hooks of the tire body to form the puncture-proof and run-flat tire.

1 Claim, 14 Drawing Sheets

PUNCTURE-PROOF AND RUN-FLAT TIRE

BACKGROUND OF THE INVENTION

Technical Field

The present invention relates generally to a puncture-proof and run-flat tire, and more particularly to a tire structure which could improve safety and could be rapidly assembled.

Description of Related Art

In general, conventional tires are classified into two types, namely a tire with an inner tube and a tubeless tire. Neither the tire with the inner tube nor the tubeless tire could prevent damage caused by foreign objects. The inner tube of the tire with the inner tube is inflated to generate a tension, thereby expanding an outer tire to form an operative tire body. However, when the tire body is punctured by a sharp object or a blade, the tire body leaks and is no longer operative, and a vehicle having the tire body has to stop immediately. When the tire body is blown out during travelling at high speed, traffic accident might be resulted. The tubeless tire prevents immediate leakage when the tubeless tire is punctured by foreign objects, thereby providing sufficient time for a user to drive the vehicle to a garage for repair. However, a tire pressure of the tubeless tire does not decrease significantly when the tire body is punctured by the sharp object. If the user does not inspect the tubeless tire due to carelessness after the tubeless tire becomes flat, the tire pressure might be decreased rapidly when the vehicle travels at high speed on a bumpy road. As a result, severe traffic accident might be resulted.

In all aspects, the conventional tires still have room for improvement. How to provide a tire structure which has a simple structure and could be rapidly assembled, has become a major issue in the industry.

BRIEF SUMMARY OF THE INVENTION

In view of the above, the primary objective of the present invention is to provide a puncture-proof and run-flat tire that could be rapidly assembled, wherein a spare tire is adaptive to an tire body by finely adjusted and locked, thereby providing puncture-proof and run-flat function. The puncture-proof and run-flat tire mainly includes an tire body and a spare tire engaged with the tire body. The tire body has two protruding hooks on two inner edges on two sides of an inner ring of the tire body. The spare tire is finely adjusted to fix to one of the protruding hooks of the tire body. A vehicle could continue travelling safely if the tire body becomes flat due to damage caused by a sharp object or a blade. The spare tire includes a plurality of spare tire blocks that are connected to one another and assembled with an elastic ring, a first fine-adjustment wire, and a second fine-adjustment wire. Therefore, the spare tire could be rapidly mounted on the protruding hooks of the tire body to form the puncture-proof and run-flat tire.

With the aforementioned design, the spare tire could be directly fitted onto the protruding hooks of the tire body and could be finely adjusted and locked, so that the puncture-proof and run-flat tire could be rapidly assembled. In this way, the puncture-proof and run-flat tire allows the vehicle to continue travelling safely to a garage for repair even if the tire body becomes flat due to damage caused by a sharp object or a blade, so that the vehicle could continue travelling without stopping immediately and accident could be prevented, thereby improving the safety of the traffic.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
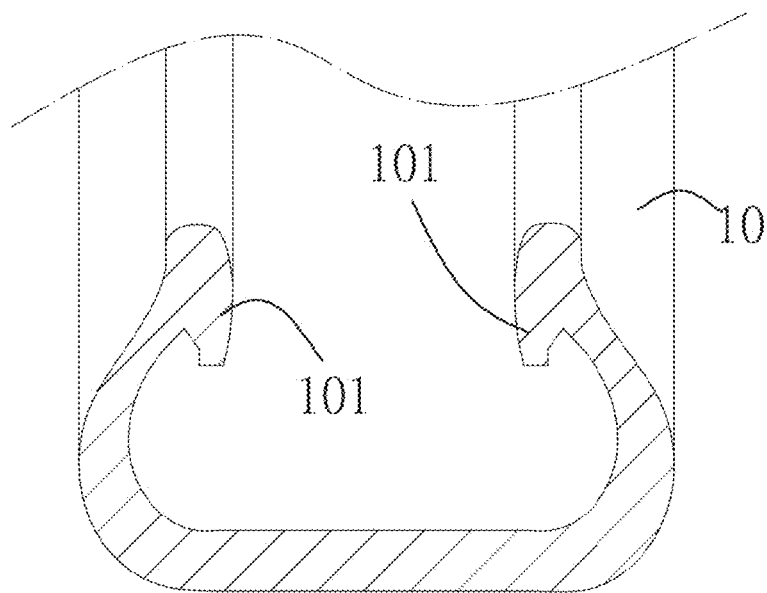
FIG. 1 is a schematic perspective view, showing a section of a part of the tire body according to an embodiment of the present invention.

The present invention provides a puncture-proof and run-flat tire. The puncture-proof and run-flat tire according to an embodiment of the present invention mainly includes an tire body 10 (shown in FIG. 1). Two protruding hooks 101, which are ring-shaped, are formed by protruding from two inner edges on two sides of an inner ring of the tire body 10. An inner layer of the tire body 10 is provided with a plurality of reinforced carcass piles.

Figure 2:
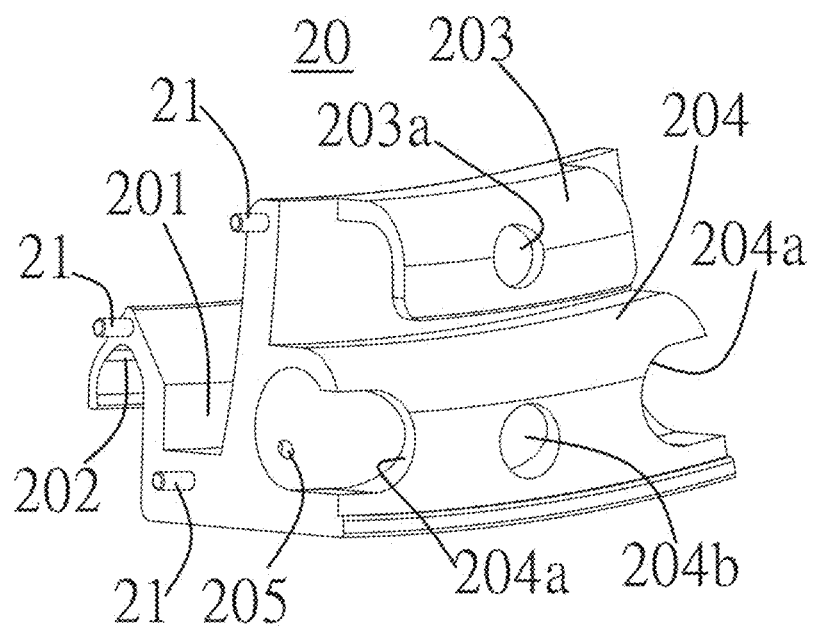
FIG. 2 is a schematic perspective view of the spare tire block according to the embodiment of the present invention.
Figure 3:
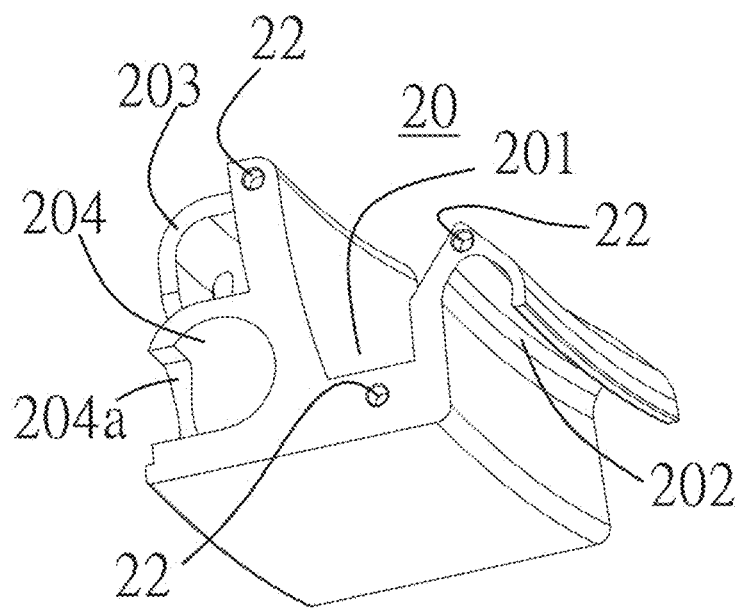
FIG. 3 is a schematic perspective view of the spare tire block according to the embodiment of the present invention seen from another direction.
Figure 4:
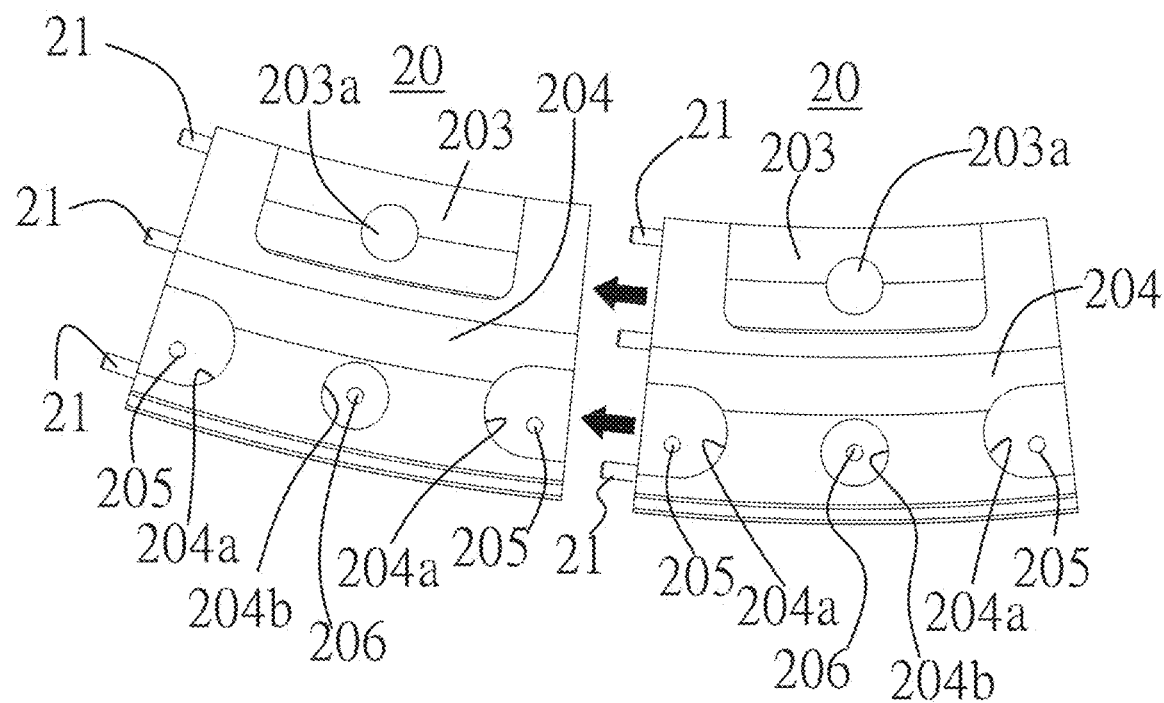
FIG. 4 is a schematic view, showing that two of the spare tire blocks are about to be connected.

A plurality of spare tire blocks 20 is provided (shown in FIG. 2, FIG. 3, and FIG. 4). A top end of each of the spare tire blocks 20 is recessed to form a hooked groove 201. A side of the hooked groove 201 protrudes to form a hooking groove 202. Another side of the hooked groove 201 protrudes to form a hooking body 203. A surface of the hooking body 203 is provided with a through hole 203a. A bottom side of each of the spare tire blocks 20 protrudes to form a tubular body 204 which is located below the hooking body 203. Two recesses 204a are provided on two ends of an outer surface of the tubular body 204, respectively. A through hole 204b is provided on a middle of the outer surface of the tubular body 204. Two positioning holes 205 are provided on an inner wall of the tubular body 204 and respectively correspond to the two recesses 204a of the outer surface of the tubular body 204. A locking hole 206 is provided on a middle of the inner wall of the tubular body 204 and corresponds to the through hole 204b on the middle of the outer surface of the tubular body 204. A plurality of insertion rods 21 is provided on an end surface of each of the spare tire blocks (shown in FIG. 2). A plurality of blind holes 22 is formed by recessing into another end surface of each of the spare tire blocks 20 (shown in FIG. 3) and correspond to the insertion rods 21. The spare tire blocks 20 are connected to one another by the insertion rods 21 one of the spare tire blocks 20 aligning and engaging with the blind holes 22 of another one of the spare tire blocks 20.

The through hole 203a of the hooking body 203 of each of the spare tire blocks 20, the recesses 204a on the two ends of the outer surface of the tubular body 204, and the through hole 204b on the middle of the tubular body 204 are mainly for a user to operate with tools.

An elastic ring 30 (shown in FIG. 5, FIG. 6, FIG. 8, and FIG. 10) is an elastic annular band with a high clamping force. The elastic ring 30 is disposed in the hooking grooves 202 of the spare tire blocks 20.

A first fine-adjustment wire 40 (shown in FIG. 5, FIG. 6, FIG. 7, FIG. 9, and FIG. 10) is disposed in the hooking bodies 203 of the spare tire blocks 20. The first fine-adjustment wire 40 is a steel cable 401, wherein a locked tube 402 and a screw tube 403 are provided on two ends of the steel cable 401, respectively. A bolt 41 passes through the locked tube 402 to screw into the screw tube 403 for fine-adjustment and locking. Two set screws 402a, 403a are provided on the locked tube 402 and the screw tube 403, respectively, and are adapted to fasten the bolt 41 and to prevent loosening.

A second fine-adjustment wire 50 (shown in FIG. 5, FIG. 6, FIG. 7, FIG. 9A, and FIG. 10) is disposed in the tubular bodies 204 of the spare tire blocks 20. The second fine-adjustment wire 50 is a steel cable 501, wherein a locked tube 502 and a screw tube 503 are provided on two ends of the steel cable 501 of the second fine-adjustment wire 50, respectively. A bolt 51 passes through the locked tube 502 to screw into the screw tube 503 for fine-adjustment and locking. Two links 504, 505 are provided on a bottom of the two ends of the steel cable, respectively. Each of the links 504, 505 has a fixing hole 504a (505a) and two positioning holes 504b (505b) spaced by an interval. Each of the links 504, 505 further has a retaining hole 504c (505c) located at a middle between the two positioning holes 504b (505b). Two set screws 502a, 503a are respectively provided on the locked tube 502 and the screw tube 503 to fasten the bolt 51, and a C-shaped retaining ring 61 is adapted to insert into the two retaining holes 504c, 505c, of the two links 504, 505 for preventing loosening.

Figure 5:
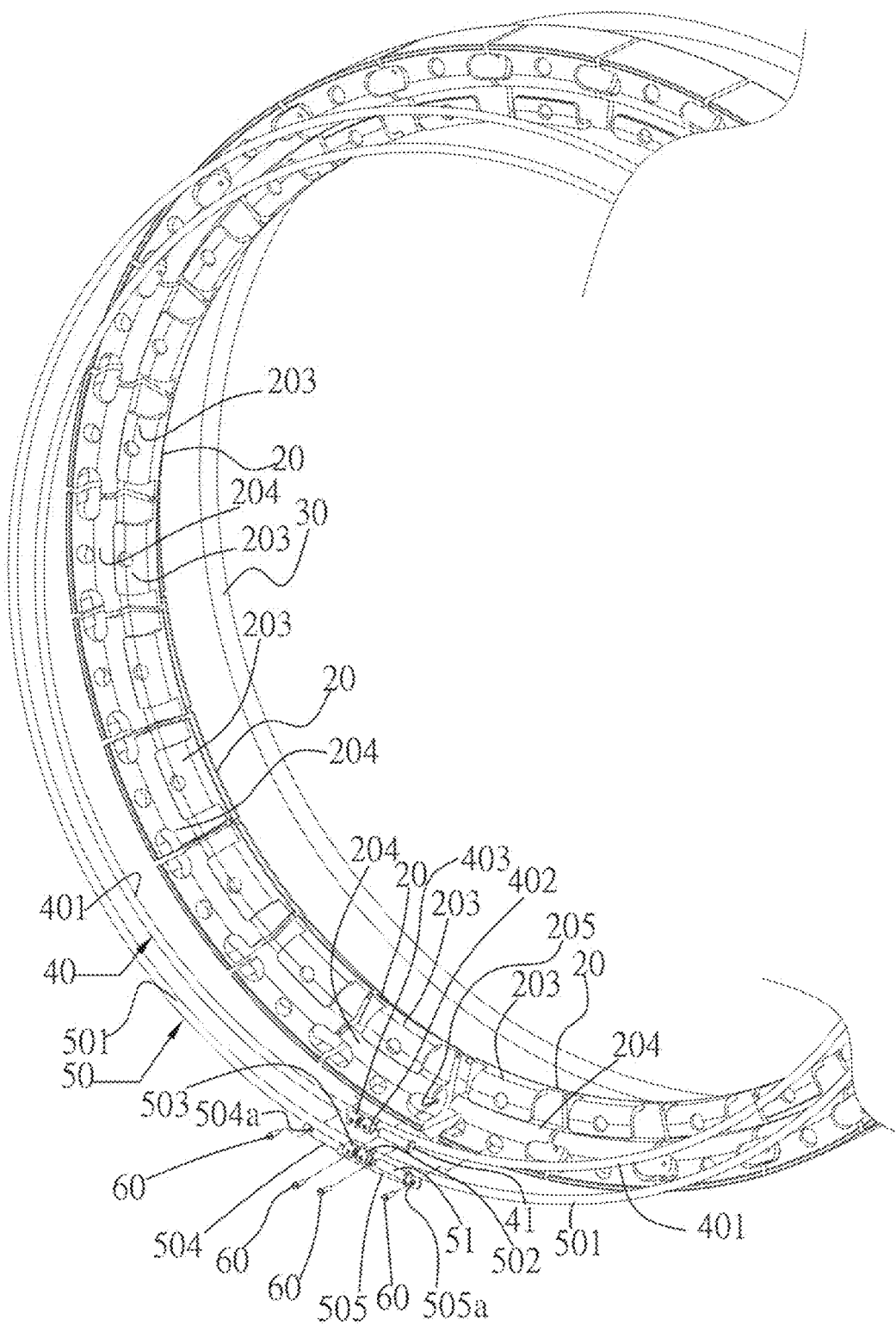
FIG. 5 is a schematic view, showing that a part of the puncture-proof and run-flat tire is exploded.
Figure 6:
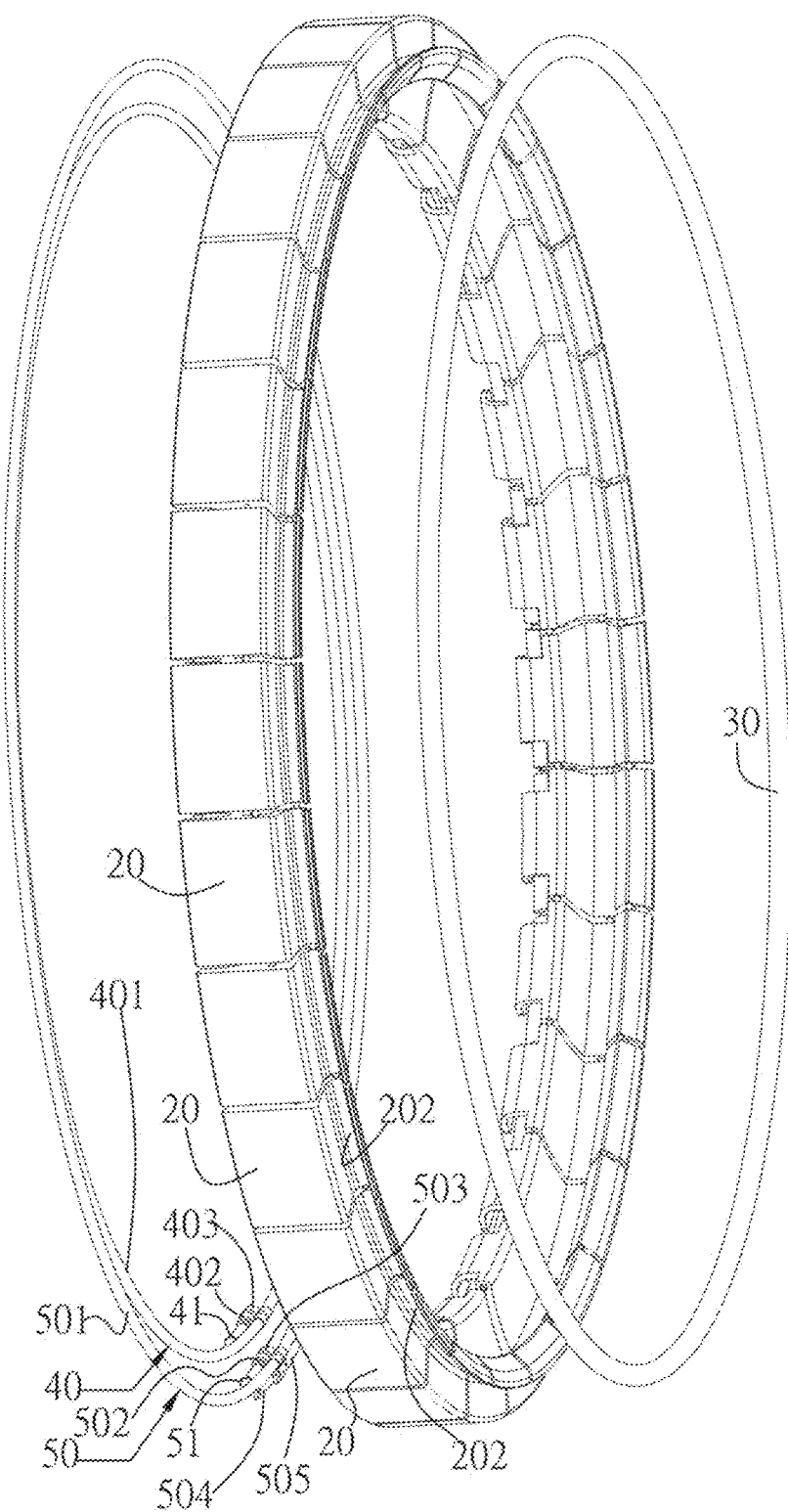
FIG. 6 is a schematic view, showing the elastic ring, the first fine-adjustment wire, and the second fine-adjustment wire are separated from the spare tire blocks.
Figure 7:
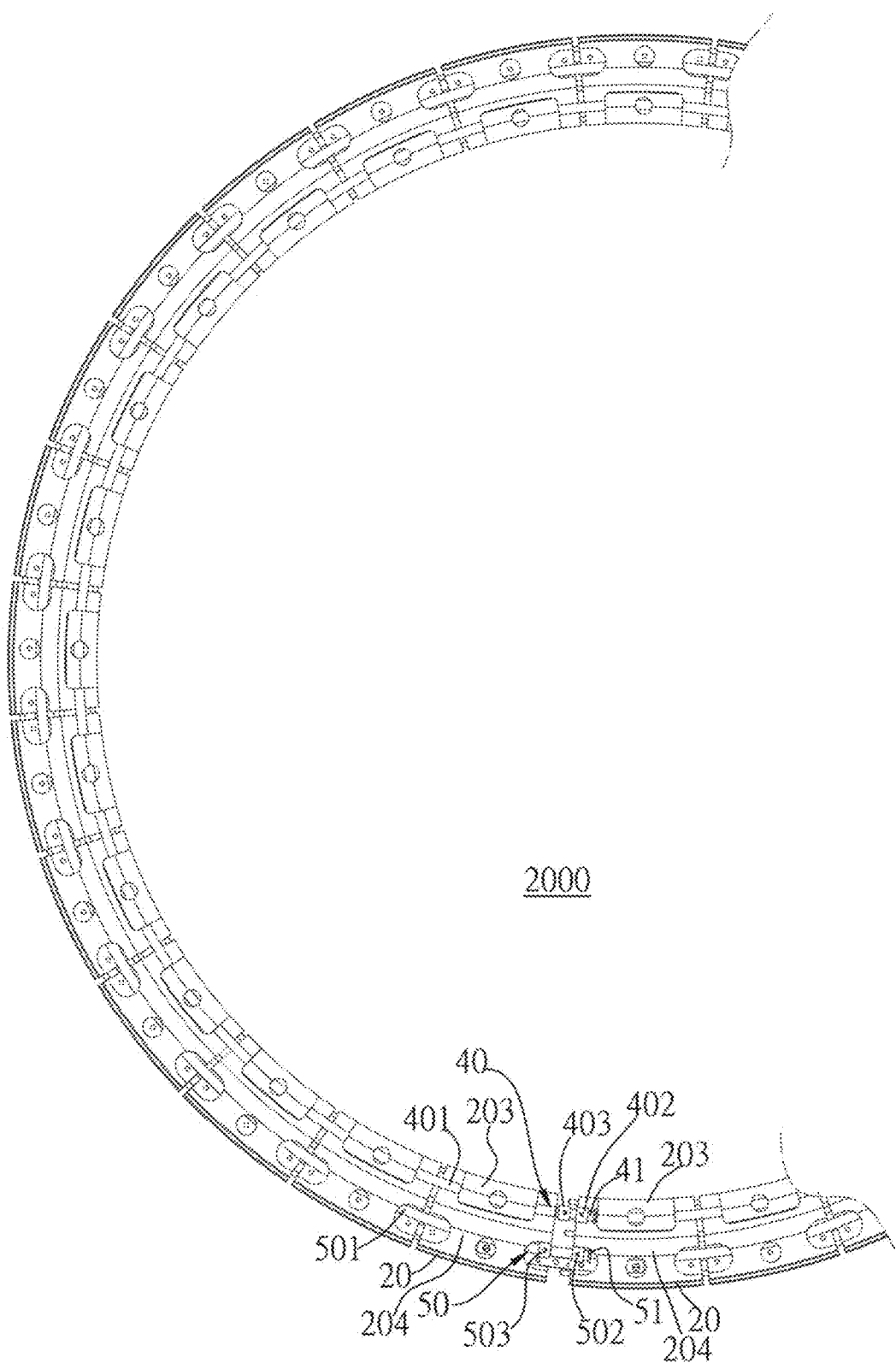
FIG. 7 is a schematic view, showing a part of the spare tire according to the embodiment of the present invention.
Figure 8:
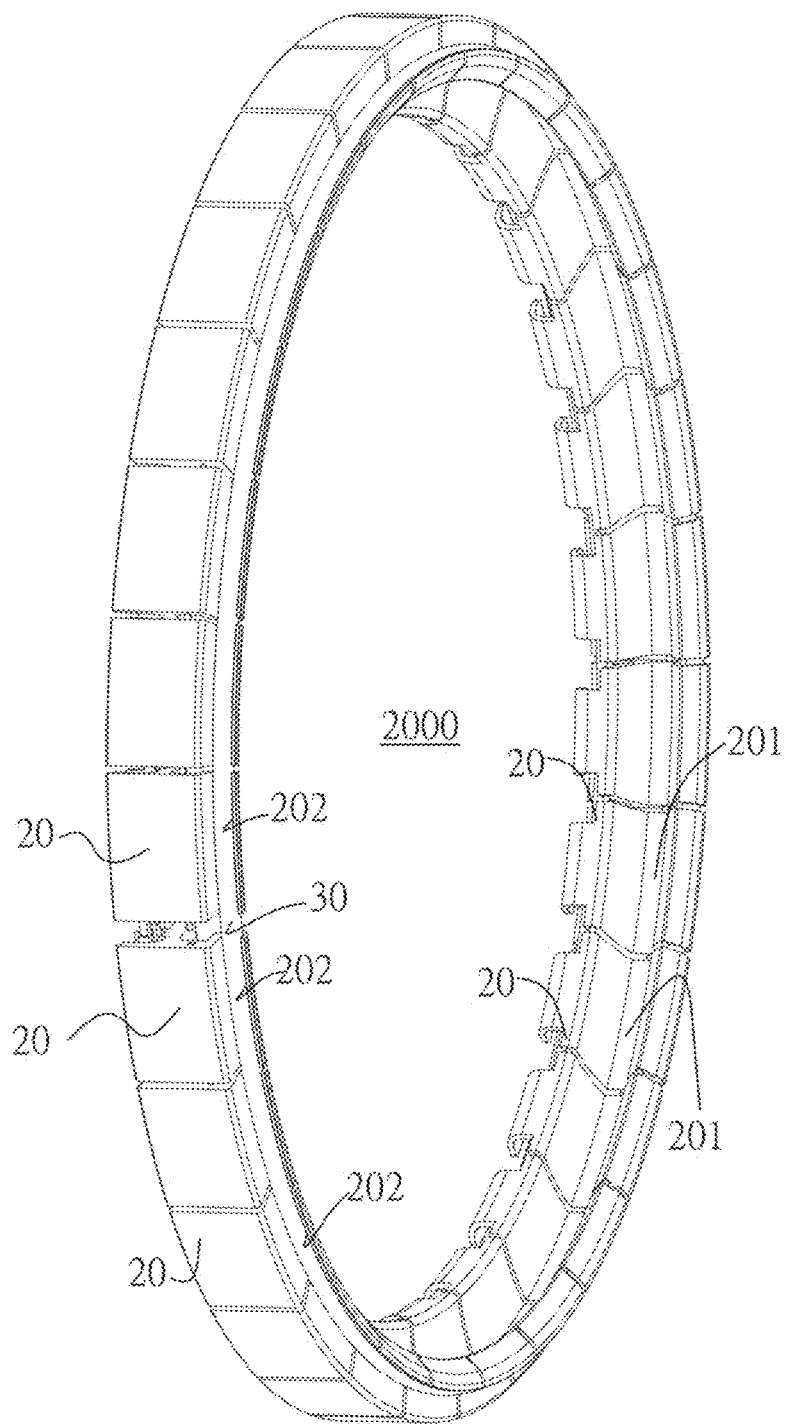
FIG. 8 is a schematic view of the spare tire according to the embodiment of the present invention.
Figure 9:
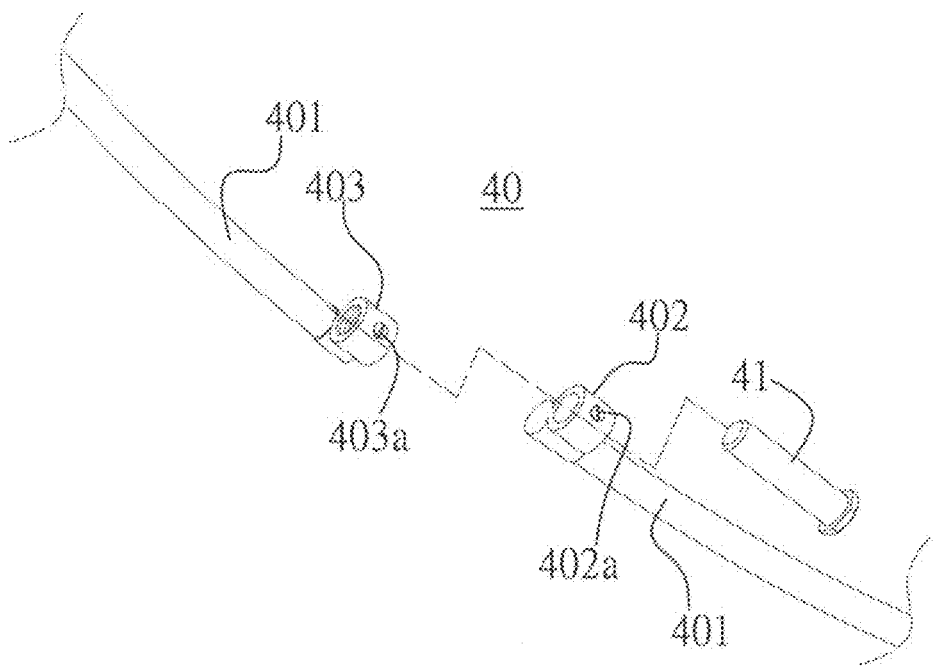
FIG. 9 is an exploded view of a part of the first fine-adjustment wire according to the embodiment of the present invention.
Figure 9A:
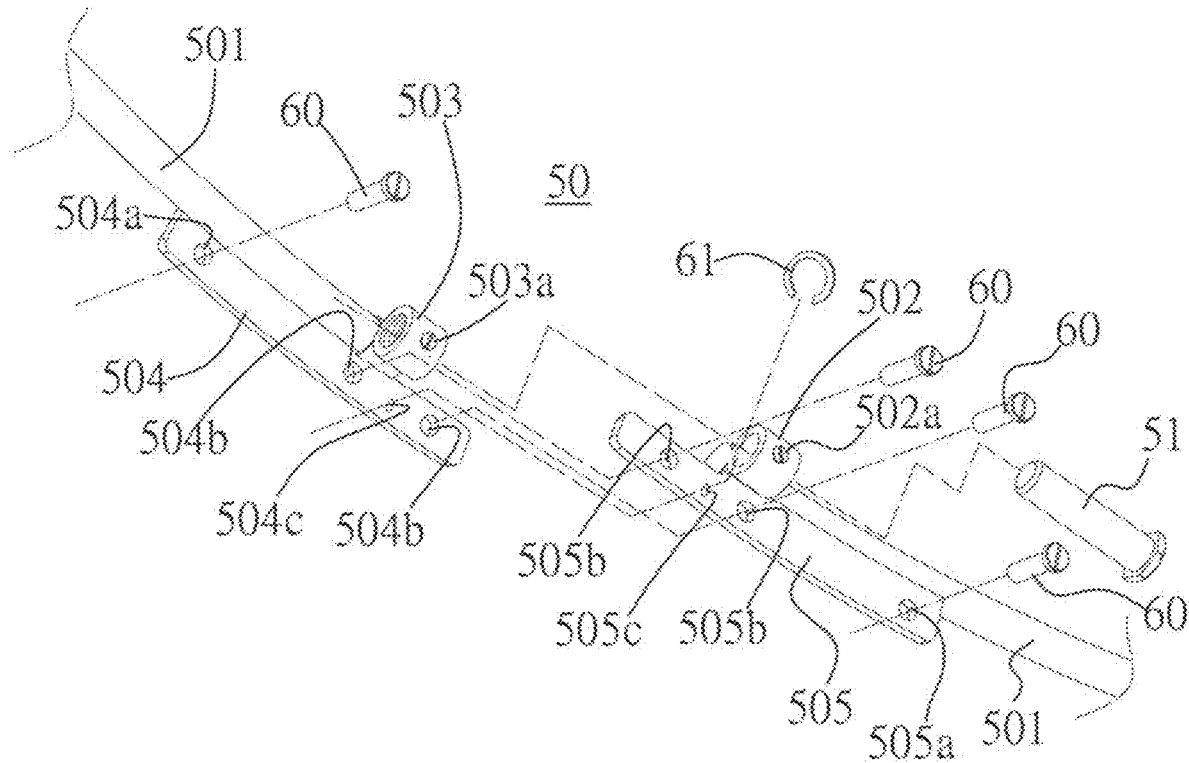
FIG. 9A is an exploded view of a part of the second fine-adjustment wire according to the embodiment of the present invention.
Figure 12:
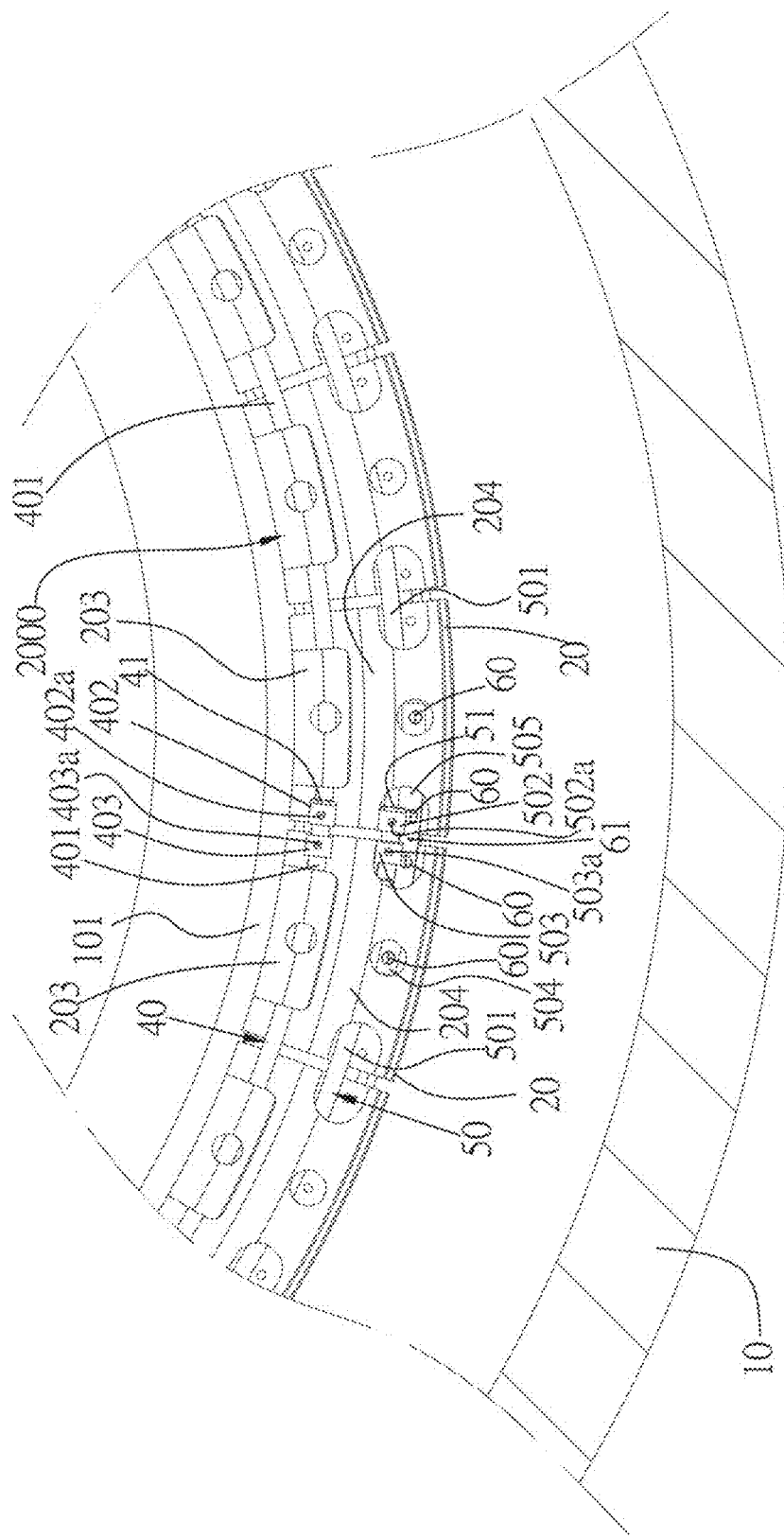
FIG. 12 is a schematic sectional view, showing a part of the spare tire engaged with the tire body.

FIG. 5 is a schematic view, showing that a part of the puncture-proof and run-flat tire is exploded. The spare tire blocks 20 are connected to one another by the insertion rods 21 on the end surface of one of the spare tire blocks 20 aligning and engaging with the blind holes 22 of another one of the spare tire blocks 20 (shown in FIG. 2 to FIG. 4). The first fine-adjustment wire 40 is disposed in the hooking bodies 203 of the spare tire blocks 20 (shown in FIG. 7, FIG. 9, and FIG. 12), and the bolt 41 passes through the locked tube 402 of the first fine-adjustment wire 40 to screw into the screw tube 403. The second fine-adjustment wire 50 is disposed in the tubular bodies 204 of the spare tire blocks 20. The fixing hole 504a of the link 504 on one of the two ends of the steel cable 501 of the second fine-adjustment wire 50 corresponds to the locking hole 206 on the middle of the inner wall of the tubular body of a first spare tire block 20 of the spare tire blocks 20 (shown in FIG. 9A), and the fixing hole 505a of the link 505 on the other end of the steel cable 501 of the second fine-adjustment wire 50 corresponds to the locking hole 206 on the middle of the inner wall of the tubular body of a last spare tire block 20 of the spare tire blocks 20 (shown in FIG. 4 and FIG. 12). Two additional bolts 60 are provided. One of the additional bolts 60 is fastened in the fixing hole 504a of the link 504 of the second fine-adjustment wire 50 and the locking hole 206 of the first spare tire block 20. The other additional blot 60 is fastened in the fixing hole 505a of the link 505 of the second fine-adjustment wire 50 and the locking hole 206 of the last spare tire block 20. The bolt 51 is fastened in the locked tube 502 and the screw tube 503 on the two ends of the steel cable 51 of the second fine-adjustment wire 50. The elastic ring 30 is disposed in the hooking grooves 202 of the spare tire blocks 20 (shown in FIG. 6, FIG. 8, and FIG. 10). In this way, a spare tire 2000, which is elastic and has a high clamping force, is formed.

Figure 10:
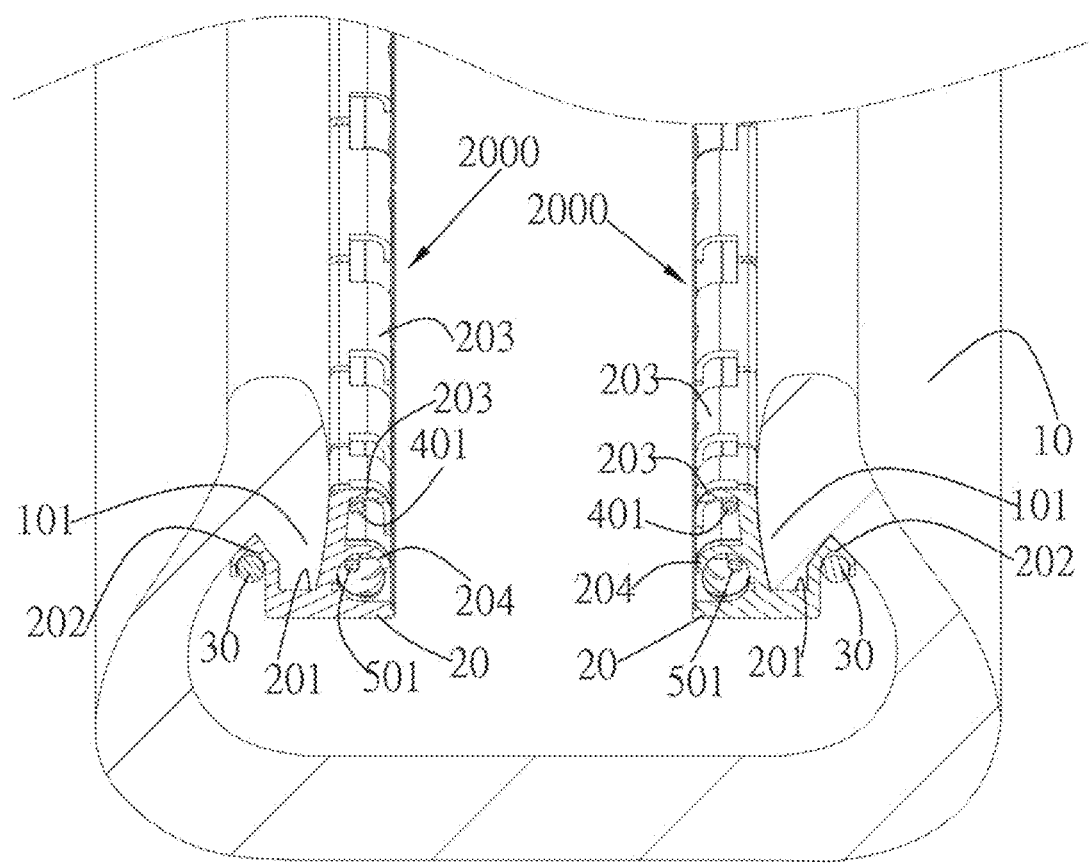
FIG. 10 is a schematic sectional view, showing that the spare tire is engaged with tire body.
Figure 11:
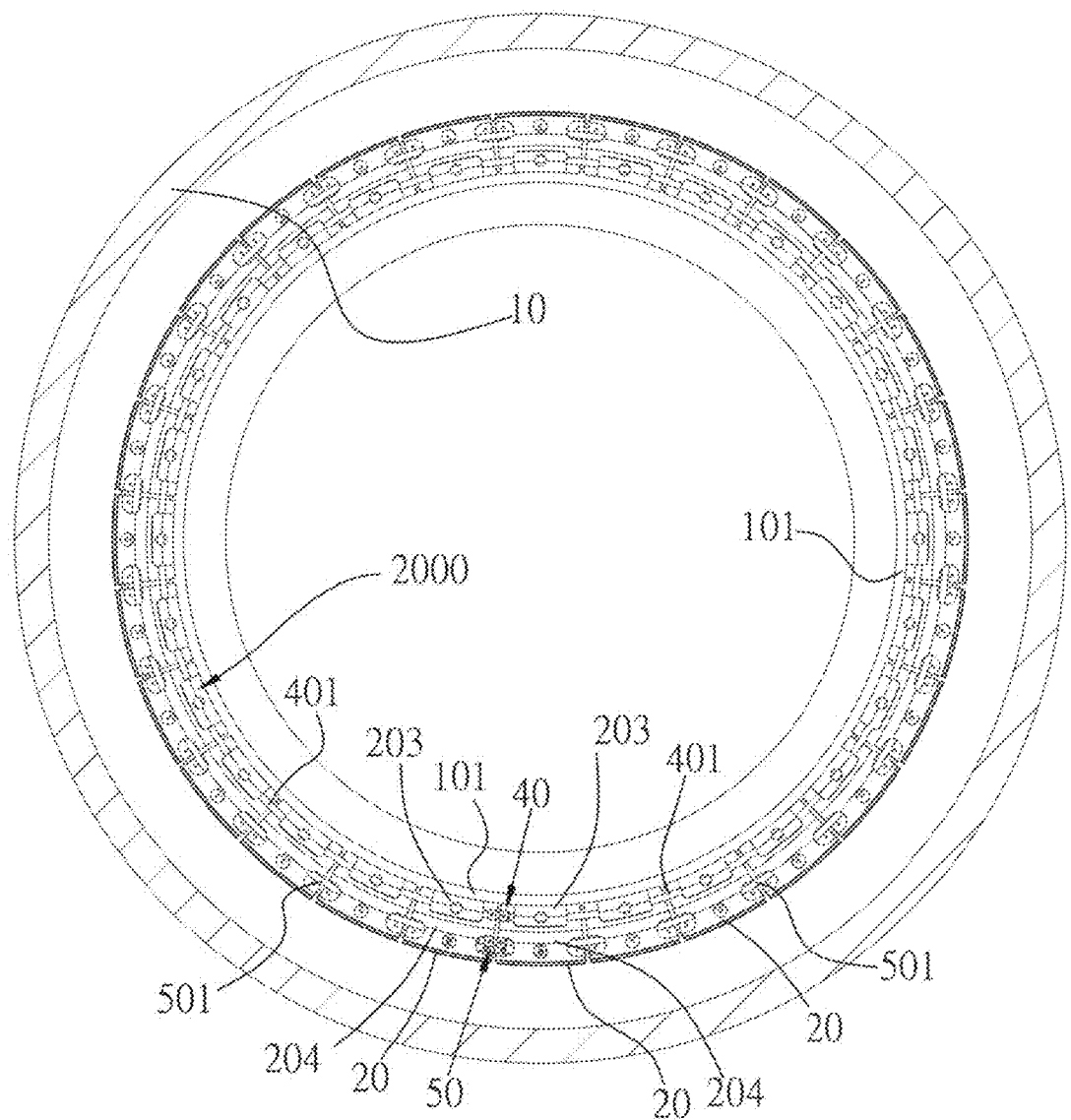
FIG. 11 is another schematic sectional view, showing that the spare tire is engaged with the tire body.

FIG. 10 is a schematic sectional view, showing that the spare tire 2000 is engaged with the tire body 10. The hooked grooves 201 of the spare tire blocks 20 of the spare tire 2000 are engaged with one of the two protruding hooks 101 of the tire body 10 (shown in FIG. 8, FIG. 11, and FIG. 12). The bolt 41 on the locked tube 402 and the screw tube 403 on the two ends of the steel cable 401 of the first fine-adjustment wire 40 in the hooking bodies 203 of the spare tire blocks 20 of the spare tire 2000 is finely adjusted and fastened to tightly fix the spare tire blocks 20 to the protruding hook 101 of the tire body 10. The set screws 402a, 403a on the locked tube 402 and the screw tube 403 fasten the bolt 41 to prevent loosening. The bolt 51 on the locked tube 502 and the screw tube 503 on the two ends of the steel cable 501 of the second fine-adjustment wire 50 in the tubular bodies 204 of the spare tire blocks 20 is finely adjusted and fastened (shown in FIG. 9A and FIG. 5). The set screws 502a, 503a on the locked tube 502 and the screw tube 503 of the second fine-adjustment wire 50 fasten the bolt 51 to prevent loosening. In this way, the two links 504, 505 on the two ends of the steel cable 501 of the second fine-adjustment wire 50 are stacked on each other, the two positioning holes 504b of the link 504 on one of the two ends of the steel cable 501 of the second fine-adjustment wire 50 correspond to the two positioning holes 505b of the link 505 on the other end of the steel cable 501 of the second fine-adjustment wire 50, and the retaining hole 504c of the link 504 corresponds to the retaining hole 505c of the link 505. At the same time, the two positioning holes 504b (505b) of each of the two links 504 (505) respectively correspond to one of the two positioning holes 205 on the inner wall of the tubular body 204 of the first spare tire block 20 and one of the two positioning holes 205 on the inner wall of the tubular body 204 of the last spare tire block 20. Two additional bolts 60 are provided. One of the additional bolts 60 of the second fine-adjustment wire 50 is fastened in one of the positioning holes 504b of the link 504, one of the positioning holes 205 of the first spare tire block 20, and one of the positioning holes 505b of the link 505. The other additional bolts 60 of the second fine-adjustment wire 50 is fastened in the other positioning hole 504b of the link 504, one of the positioning holes 205 of the last spare tire block 20, and the other positioning hole 505b of the link 505. The C-shaped retaining ring 61 is inserted into the retaining hole 504c of the link 504 and the retaining hole 505c of the link 505 to prevent loosening. The elastic ring 30 is located in the hooking grooves 202 of the spare tire blocks 20 of the spare tire 2000 to form the high clamping force. In this way, the spare tire 2000 is tightly engaged with the protruding hook 101 of the tire body 10 to form the puncture-proof and run-flat tire.

Figure 13:
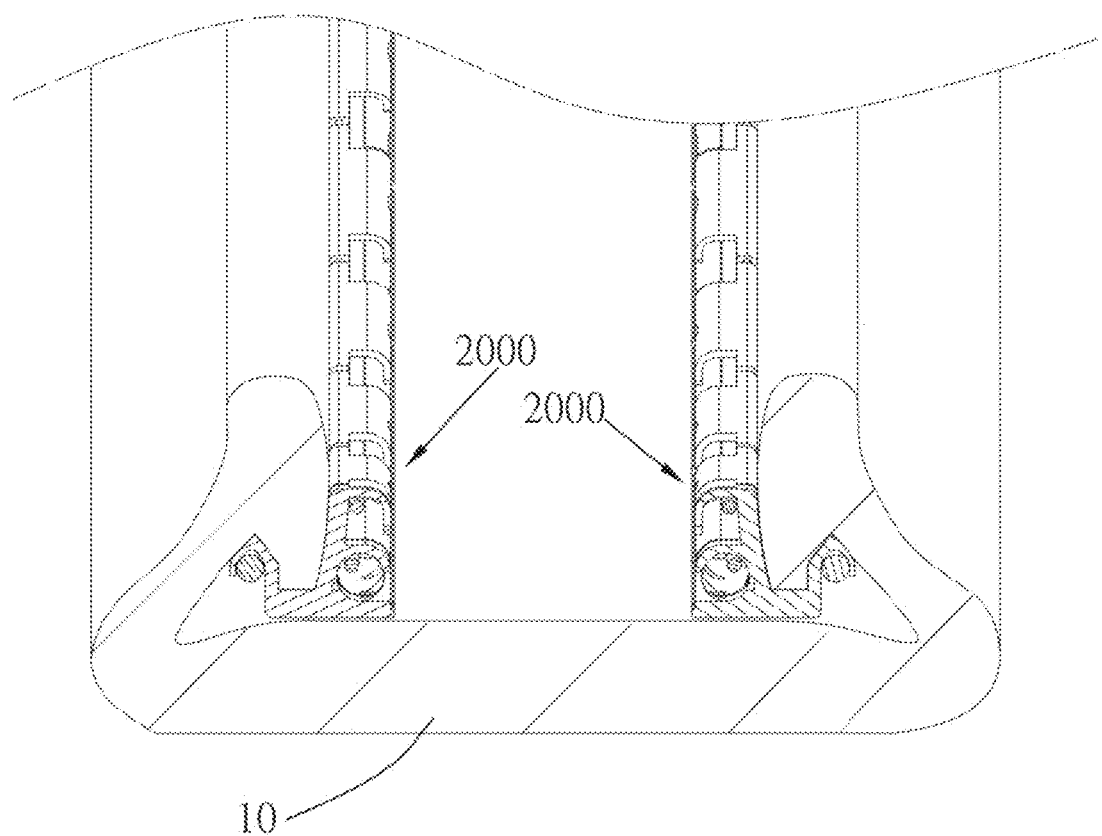
FIG. 13 is a schematic sectional view, showing that the puncture-proof and run-flat tire operates with the spare tire.

FIG. 13 is a schematic sectional view, showing that the puncture-proof and run-flat tire operates with the spare tire 2000. When the tire body 10 is broken by a sharp object or a blade to become flat, the puncture-proof and run-flat tire operates with the spare tire 2000 for travelling subsequently to ensure safety.

In this way, the present invention provides the puncture-proof and run-flat tire to ensure safety during driving, wherein the puncture-proof and run-flat tire has a simple structure and could reduce cost and be rapidly assembled.

It must be pointed out that the embodiments described above are only some preferred embodiments of the present invention. All equivalent structures which employ the concepts disclosed in this specification and the appended claims should fall within the scope of the present invention.

What is claimed is:

1. A puncture-proof and run-flat tire, comprising:
an tire body, wherein two protruding hooks, which are ring-shaped, are formed by protruding from two inner edges of two sides of an inner ring of the tire body, and an inner layer of the tire body is provided with a plurality of reinforced carcass piles;
a plurality of spare tire blocks, wherein a top end of each of the plurality of spare tire blocks is recessed to form a hooked groove, a side of the hooked groove protrudes to form a hooking groove, another side of the hooked groove protrudes to form a hooking body, a surface of the hooking body is provided with a through hole, a bottom side of each of the plurality of spare tire blocks protrudes to form a tubular body which is located below the hooking body, two recesses are provided on two ends of an outer surface of the tubular body, respectively, a through hole is provided on a middle of the outer surface of the tubular body, two positioning holes are provided on an inner wall of the tubular body and respectively correspond to the two recesses of the outer surface of the tubular body, a locking hole is provided on a middle of the inner wall of the tubular body and corresponds to the through hole on the middle of the outer surface of the tubular body, a plurality of insertion rods is provided on an end surface of each of the plurality of spare tire blocks, a plurality of blind holes is formed by recessing into another end surface of each of the plurality of spare tire blocks, and the plurality of spare tire blocks are connected to one another by the plurality of insertion rods of one of the plurality of spare tire blocks aligning and engaging with the plurality of blind holes of another one of the plurality of spare tire blocks;
an elastic ring, which is an elastic annular band with a high clamping force, disposed in the hooking grooves of the plurality of spare tire blocks;
a first fine-adjustment wire, disposed in the hooking bodies of the plurality of spare tire blocks, wherein the first fine-adjustment wire is a steel cable, a locked tube and a screw tube are provided on two ends of the steel cable of the first fine-adjustment wire, respectively, a bolt passes through the locked tube of the first fine-adjustment wire to screw into the screw tube of the first fine-adjustment wire for fine-adjustment and locking, and two set screws are respectively provided on the locked tube of the first fine-adjustment wire and the screw tube of the first fine-adjustment wire and are adapted to fasten the bolt of the first fine-adjustment wire and to prevent loosening;
a second fine-adjustment wire, disposed in the tubular bodies of the plurality of spare tire blocks, wherein the second fine-adjustment wire is a steel cable, a locked tube and a screw tube are provided on two ends of the steel cable of the second fine-adjustment wire, respectively, a bolt passes through the locked tube of the second fine-adjustment wire to screw into the screw tube of the second fine-adjustment wire for fine-adjustment and locking, two links are provided on a bottom of the two ends of the steel cable of the second fine-adjustment wire, respectively, each of the two links has a fixing hole and two positioning holes spaced by an interval, each of the two links further has a retaining hole located at a middle between the two positioning holes of each of the two links, two set screws are respectively provided on the locked tube of the second fine-adjustment wire and the screw tube of the second fine-adjustment wire to fasten the bolt of the second fine-adjustment wire, and a C-shaped retaining ring is adapted to insert into the two retaining holes of the two links for preventing loosening;
wherein the plurality of spare tire blocks are connected to one another by the plurality of insertion rods on the end surface of one of the plurality of spare tire blocks aligning and engaging with the plurality of blind holes on the another end surface of another one of the plurality of spare tire blocks, the first fine-adjustment wire is disposed in the hooking bodies of the plurality of spare tire blocks, the bolt of the first fine-adjustment wire passes through the locked tube of the first fine-adjustment wire to screw into the screw tube of the first fine-adjustment wire, the second fine-adjustment wire is disposed in the tubular bodies of the plurality of spare tire blocks, the fixing hole of one of the two links on one of the two ends of the steel cable of the second fine-adjustment wire corresponds to the locking hole of the middle of the inner wall of the tubular body of a first spare tire block of the plurality of spare tire blocks, the fixing hole of the other link on the other end of the steel cable of the second fine-adjustment wire corresponds to the locking hole of the middle of the inner wall of the tubular body of a last spare tire block of the plurality of spare tire blocks, four additional bolts are provided, one of the four additional bolts is fastened in the fixing hole of one of the two links of the second fine-adjustment wire and the locking hole of the first spare tire block of the plurality of spare tire blocks, another one of the four additional bolt is fastened in the fixing hole of the other link of the second fine-adjustment wire and the locking hole of the last spare tire block of the plurality of spare tire blocks, the bolt of the second fine-adjustment wire is fastened in the locked tube of the second fine-adjustment wire and the screw tube of the second fine-adjustment wire on the two ends of the steel cable of the second fine-adjustment wire, and the elastic ring is disposed in the hooking grooves of the plurality of spare tire blocks, thereby forming a spare tire which is elastic and has a high clamping force;
wherein the hooked grooves of the plurality of spare tire blocks of the spare tire are engaged with one of the two protruding hooks of the tire body, the bolt of the first fine-adjustment wire on the locked tube of the first fine-adjustment wire and the screw tube of the first fine-adjustment wire on the two ends of the steel cable of the first fine-adjustment wire in the hooking bodies of the plurality of spare tire blocks of the spare tire is finely adjusted and fastened to tightly fix the plurality of spare tire blocks to the protruding hook of the tire body, the two set screws of the first fine-adjustment wire on the locked tube of the first fine-adjustment wire and the screw tube of the first fine-adjustment wire fasten the bolt of the first fine-adjustment wire to prevent loosening, the bolt of the second fine-adjustment wire on the locked tube of the second fine-adjustment wire and the screw tube of the second fine-adjustment wire on the two ends of the steel cable of the second fine-adjustment wire in the tubular bodies of the plurality of spare tire blocks is finely adjusted and fastened, the two set screws of the second fine-adjustment wire on the locked tube of the second fine-adjustment wire and the screw tube of the second fine-adjustment wire fasten the bolt of the second fine-adjustment wire to prevent loosening, the two links on the two ends of the steel cable of the second fine-adjustment wire are stacked on each other, the two positioning holes, which are spaced by the interval, and the retaining hole of one of the two links on one of the two ends of the steel cable of the second fine-adjustment wire correspond to the two positioning holes and the retaining hole of the other link on the other end of the steel cable of the second fine-adjustment wire, the two positioning holes of each of the two links respectively correspond to one of the two positioning holes on the inner wall of the tubular body of the first spare tire block and one of the two positioning holes on the inner wall of the tubular body of the last spare tire block, still another one of the four additional bolts is fastened in one of the two positioning holes of one of the two links, one of the two positioning holes of the first spare tire block, and one of the two positioning holes of the other link, a remaining one of the four additional bolts is fastened in the other positioning hole of one of the two links, one of the two positioning holes of the last spare tire block, and the other positioning hole of the other link, the C-shaped retaining ring is inserted into the two retaining holes of the two links to prevent loosening, and the elastic ring is located in the hooking grooves of the plurality of spare tire blocks of the spare tire to form the high clamping force, thereby tightly engaging the spare tire with one of the two protruding hooks of the tire body to form the puncture-proof and run-flat tire.

\* \* \* \* \*